US006307601B1

(12) United States Patent
Kakuda et al.

(10) Patent No.: US 6,307,601 B1
(45) Date of Patent: Oct. 23, 2001

(54) PROJECTION TYPE LIQUID CRYSTAL DISPLAY DEVICE

(75) Inventors: Takashi Kakuda; Masaharu Deguchi, both of Yokohama; Futoshi Yamasaki, Zushi; Takesuke Maruyama; Naohiro Konuma, both of Yokohama; Yutaka Matsuda, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/865,085

(22) Filed: May 29, 1997

(30) Foreign Application Priority Data

Jun. 4, 1996 (JP) .................................... 8-141621

(51) Int. Cl.[7] ................................................ G02F 1/1335
(52) U.S. Cl. ................................ 349/5; 362/298; 359/853
(58) Field of Search ........................ 349/5, 6, 95, 113; 359/853, 858, 727, 730; 362/268, 298, 299, 375

(56) References Cited

U.S. PATENT DOCUMENTS

| 5,098,184 | 3/1992 | van den Brandt et al. . | |
|---|---|---|---|
| 5,309,340 | 5/1994 | Shigeta et al. . | |
| 5,355,187 | * 10/1994 | Ogino et al. ............................ | 349/5 |
| 5,491,525 | * 2/1996 | Yamasaki et al. ...................... | 349/5 |
| 5,541,746 | * 7/1996 | Hamagishi et al. .................... | 349/5 |
| 5,583,669 | * 12/1996 | Fushimi et al. ......................... | 349/5 |
| 5,626,416 | * 5/1997 | Romano et al. ........................ | 362/264 |

FOREIGN PATENT DOCUMENTS

| 0 395 156 A1 | 10/1990 | (EP) . |
|---|---|---|
| 0 563 874 A1 | 10/1993 | (EP) . |
| 5-268556 | 10/1993 | (JP) . |
| 8-304739 | 2/1996 | (JP) . |
| WO 97 22032 | 6/1997 | (WO) . |

OTHER PUBLICATIONS

M. Deguchi et al, "Development of High–Brightness Compact LC Projector," IEEE Transaction on Consumer Electronics, vol. 41, No. 3, Aug. 1995, pp. 529–535.

* cited by examiner

*Primary Examiner*—Frank G. Font
*Assistant Examiner*—Andrew H. Lee
(74) *Attorney, Agent, or Firm*—Mattingly, Stanger & Malur, P.C.

(57) ABSTRACT

A projection type liquid crystal display device using liquid crystal display elements, which has a light source; illumination optics having a function of irradiating a plane to be irradiated with light emitted by the light source; and liquid crystal display elements modulating light; projection optics for projecting light exiting from the liquid crystal display elements; wherein the illumination optics include at least an elliptic mirror and a spherical mirror, and the illumination optics include further a first lens array and a second lens array, in which a plurality of lenses are arranged perpendicularly to an optical axis, from the light source side; and a condenser lens for irradiating the liquid crystal display elements with light after exit from the second lens array with a high efficiency. In this way it is possible to realize a bright projection type liquid crystal display device having a small size and a good image quality performance.

15 Claims, 5 Drawing Sheets

OPTICAL AXIS OF LENS

OPTICAL AXIS OF LENS

PROJECTION TYPE LIQUID CRYSTAL DISPLAY DEVICE

BACKGROUND OF THE INVENTION

The present Invention relates to a projection type liquid crystal display device using liquid crystal display elements, and in particular to a projection type liquid crystal display device having a small size and a good image quality performance such as brightness, etc.

Heretofore, as an image display device, there is known a projection type display device, in which an optical image formed on light valves as variations in optical characteristics, depending on image signals, is illuminated by means of illumination optics to be enlarged and projected on a screen by means of projection optics. A number of projection type liquid crystal display devices have been proposed, each of which uses liquid crystal display elements as light valves for such a display device. A twisted nematic (TN) type liquid crystal display element, which is a representative example of a liquid crystal display element, is so constructed that two polarizers are disposed before and after a liquid crystal cell, in which liquid crystal is injected between a pair of transparent base plates, each of which has a transparent electrode film, so that polarization directions thereof differ by 90° from each other and a number of such liquid crystal display elements are arranged so that light intensity of incident light transmitted by each of them is controlled by combining an action to rotate a polarization plane by an electro-optical effect of the liquid crystal with an action to select a polarization component by one of the polarizers to display image information. Recently performance such as resolution, etc. is rapidly improved as down-sizing of such transmission type or reflection type liquid crystal display elements themselves is advanced so that down-sizing and improvement in performance of a display device using such liquid crystal display elements are advanced. In this way, projection type liquid crystal display devices have been newly proposed not only for conventional image display using video signals, etc. but also for image output devices of personal computers.

However a prior art projection type liquid crystal display device had problems that it has a large size and that performance such as brightness of image, etc. finally obtained is insufficient. Although down-sizing of light valves, i.e. liquid crystal display elements themselves, is efficient for down-sizing of a whole display device, since an area illuminated by illumination optics is decreased, when the size of liquid crystal display elements is decreased, problems take place that a ratio of a light flux projected on liquid crystal display elements to a whole light flux emitted by a light source (hereinbelow called light utilization efficiency) is lowered, etc. As the result, it was difficult to realize down-sizing of the whole device and improvement of performance such as brightness, etc. at the same time. Further, in case of a projection type liquid crystal display device, since various factors such as optical characteristics of a projection lens, optical characteristics of liquid crystal display elements, etc. apart from the illumination optics have influences on image quality performance, it was difficult to obtain a display device having a small size and a good image quality performance, if only the illumination optics were improved.

SUMMARY OF THE INVENTION

A main object of the present invention is to provide a projection type liquid crystal display device having a small size and a good image quality performance.

Another object of the present invention is to raise utilization efficiency of light emitted from a light source.

Still another object of the present invention is to make brightness uniform over a whole screen.

According to the present invention, a projection type liquid crystal display device, which includes a light source; illumination optics having an action to irradiate a surface to be irradiated with light emitted by the light source; liquid crystal display elements modulating light; and projection optics for projecting light emitted by the liquid crystal display elements, is so constructed that the illumination optics have at least one elliptic mirror and one spherical mirror and that the illumination optics comprise further a first lens array and a second lens array, in which a plurality of lenses are arranged perpendicularly to an optical axis from the light source side, and a condenser lens for irradiating the liquid crystal display elements with light, which has been emitted by the second lens array, with a high efficiency.

In this way, it is possible to realize a bright projection type liquid crystal display device having a small size and a good image quality performance by raising utilization efficiency of light emitted by the light source.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Several embodiments of the present invention will be explained below, referring the drawings.

Figure 1:
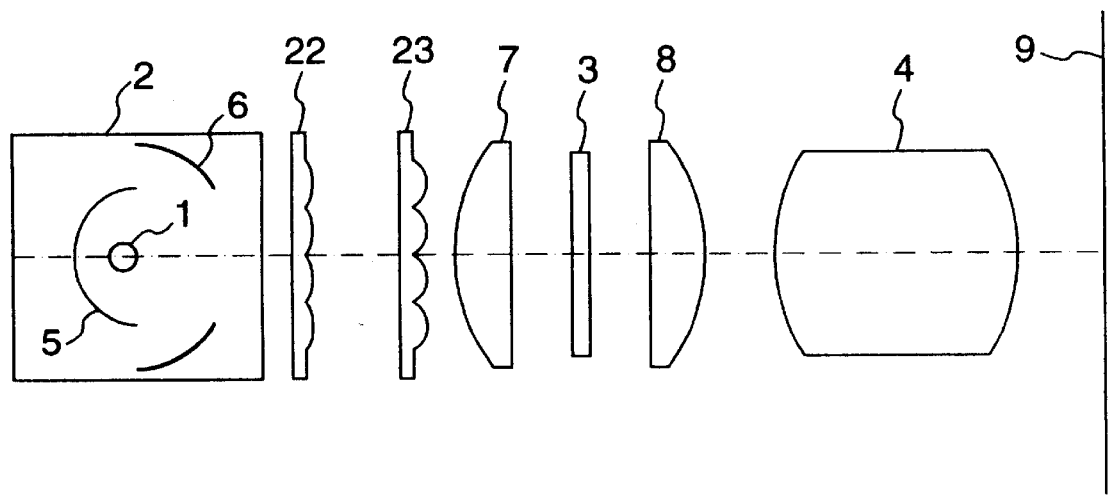
FIG. 1 is a diagram showing the construction of an optical system in a projection type liquid crystal display device according to the present invention.

FIG. 1 is a diagram showing the construction of an optical system in a projection type liquid crystal display device according to the present invention. In FIG. 1, a light source 1 is an incandescent larp such as a metal halide lamp, xenon lamp, halogen lamp, etc. In illumination optics consisting of the light source 1, an elliptic mirror 5 and a spherical mirror 6, light emitted by the light source 1 is reflected by the elliptic mirror 5 and the spherical mirror 6. After having passed through a first lens array 22, it passes through a second lens array 23 and enters a condenser lens 7. The condenser lens 7 has a positive reflective power and an action to focus further light emitted by the illumination optics 2. Light, which has passed through the condenser lens 7, irradiates liquid crystal display elements 3. Light, which has passed through the liquid crystal display elements 3, enters a field lens 8 having an action to have the light enter projection optics 4, which are e.g. a zoom lens. Thereafter it passes through the projection optics 4 to reach a screen 9. An image formed on the liquid crystal display elements 3 by the field lens 8 and the projection optics 4 is enlarged to be projected on the screen 9. Thus the whole device functions as a display device.

Figure 2:
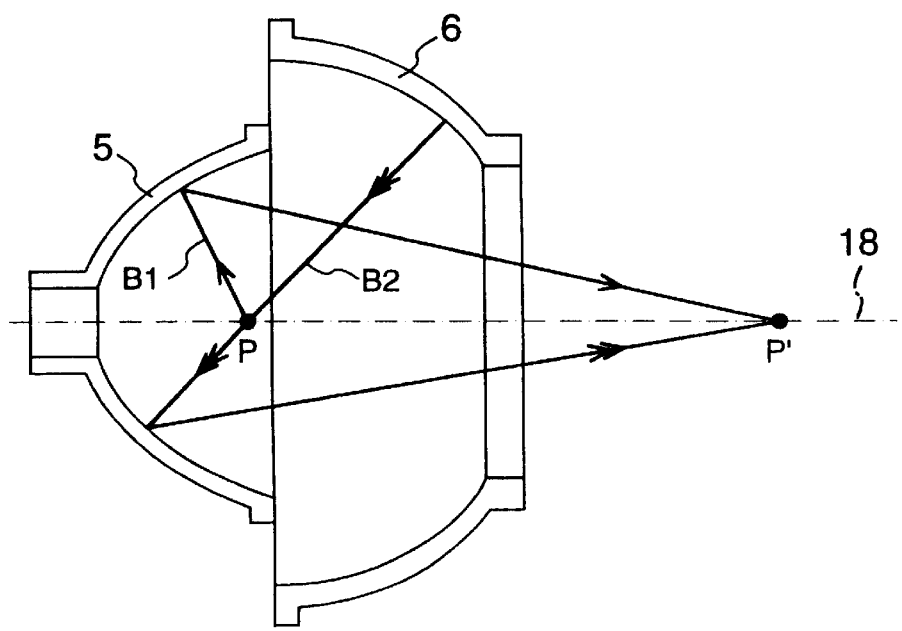
FIG. 2 is a cross-sectional diagram showing the principle of an action of a part of illumination optics in FIG. 1.

Next functions of principal parts of the projection type liquid crystal display device according to the present invention will be explained in detail. FIG. 2 is a cross-sectional diagram showing the principle of an action of a part of illumination optics in the projection type liquid crystal display device according to the present invention, which shows an aspect, in which light emitted by the light source is reflected by the elliptic mirror 5 and the spherical mirror 6.

A point P and another point P' indicated in FIG. 2 indicate positions of the first and the second focal point, respectively, of an elliptic surface, which is a reflecting surface of the elliptic mirror. Light B1 exiting from the point P towards the elliptic mirror 5 is reflected by the elliptic mirror 5 and arrives at the point P' on an optical axis 18. Consequently all the light exiting from the point P and reflected directly by the elliptic mirror 5 reaches the point P'. On the other hand, in case where the center of a spherical surface, which is a reflecting surface of the spherical mirror, is in accordance with the point P, light B2 exiting from the position of the point P towards the spherical mirror 6 is reflected by the spherical mirror 6 to return again to the point P and to proceed to the elliptic mirror 5 and reaches the point P' after having been reflected by the elliptic mirror 5. By these actions, in the light exiting from the position of the point P, in principle all the light entering the elliptic mirror 5 or the spherical mirror 6 reaches the point P'. The light B2 is light, which didn't reach heretofore the surface to be irradiated such as liquid crystal display elements, and therefore it is possible to raise the light utilization efficiency by arranging the liquid crystal display elements in the neighborhood of the point P' in the construction indicated in FIG. 2. Further, if it is tried to raise the light utilization efficiency by using only one reflecting mirror such as the elliptic mirror 5 without spherical mirror 6 as in prior art illumination optics, problems are produced that the size of reflecting mirror is increased or that a projection lens having a small F number as projecting means is required, accompanied therewith, which enlarges the size of the projection lens.

Figure 3:
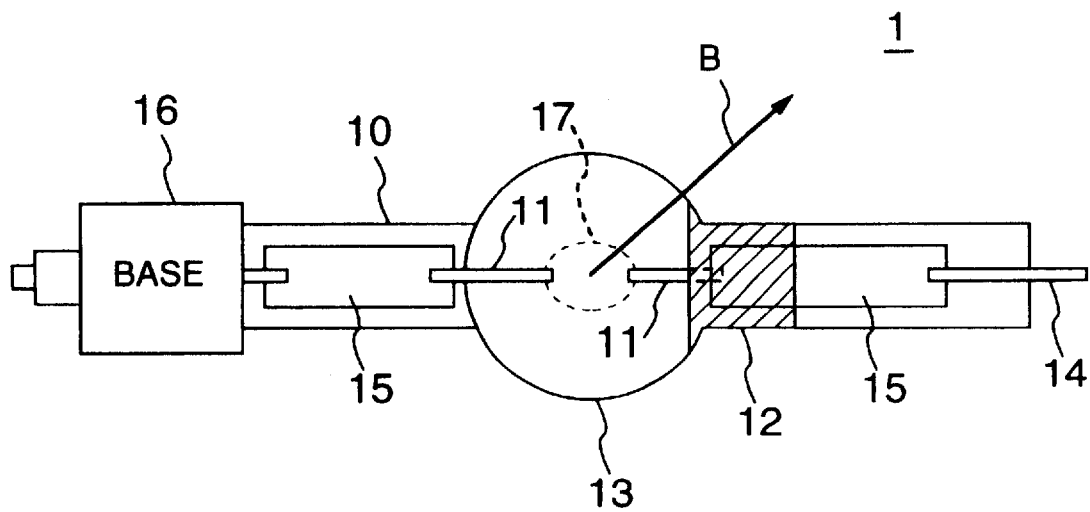
FIG. 3 is a diagram showing the construction of an embodiment of a light source used in FIG. 1.

FIG. 3 is a diagram showing the construction of an example of the light source 1 in the projection type liquid crystal display device according to the present invention, which is a construction where the light source consists in a lamp 10.

In FIG. 3, reference numeral 13 is a light emitting bulb made of quartz glass, etc., in which gas is enclosed for having it act as a device for igniting a metal vapor discharge bulb including mercury, argon, etc. In FIG. 3, reference numeral 11 is an electrode; 12 is a reflective layer; 15 is a molybdenum foil having functions to maintain air-tightness of the light emitting bulb 13, etc.; 14 is lead wire; and 16 is a base. Light is emitted from a lighting point 17 by discharge between a pair of electrodes 11. Here the reflective layer 12 is made of zirconia, etc. and has functions to maintain temperature of the light emitting bulb, to increase vapor pressure, etc., which gives rise to an effect that a satisfactory continuous light emitting property or a long life time of lamp can be obtained. However, since in the light emitted by the lighting point 17 light entering the reflective layer 12 was absorbed or diffused and reflected, illumination optics using a prior art lamp, in which the reflective layer was applied over a wide region, had a bad light utilization efficiency. In case where a lamp having the construction indicated in FIG. 3 according to the present invention is used, the reflective layer 12 is disposed only in a region in accordance with the shape of the spherical mirror. That is, the shape of the reflective layer is so determined that the light B emitted by the lighting point 17 indicated in FIG. 3 enters the spherical mirror 6 indicated in FIG. 2 without being absorbed or reflected by the reflective layer 12. In this way, by using illumination optics consisting of the lamp 10 and the construction indicated in FIG. 2 in combination, it is possible to use light, which was heretofore absorbed or diffused and reflected by the reflective layer 12, for irradiation with a high efficiency, which raises the light utilization efficiency. On the other hand, in case where a lamp is disposed so that the lighting point 17 is positioned in the neighborhood of the point P in FIG. 2, as described above, light emitted by the lighting point 17 and entering the spherical mirror 6 is reflected to return again towards the lighting point. For this reason, light reflected by the spherical mirror 6 is projected to the light emitting bulb 13 in the lamp, which has effects that the temperature of the light emitting bulb is maintained, that the vapor pressure is raised, etc. That is, the spherical mirror 6 has a function identical to that of the prior art reflective layer. Consequently it is possible to obtain illumination optics having a high light utilization efficiency by combining the the reflecting mirror construction indicated in FIG. 2 with the lamp indicated in FIG. 3, owing to mutual reactions thereof, without worsening the light emitting property, the life time, etc. of the lamp, even if the area where the reflective layer is applied is decreased.

In addition, in the construction according to the present invention, in case where the efficiency to return light from the spherical mirror 6 to the lamp is high and further a satisfactory light emitting performance, a long life time, etc. can be obtained, the reflective layer 12 may be omitted. In order to have the spherical mirror 6 have satisfactorily the function of the prior art reflective layer 12, it is preferable to form a reflecting film on the reflecting surface of the spherical mirror 6 by aluminium evaporation, etc. rather than to construct it by a dichroic mirror which reflects only visible light.

Next functions of the first and the second lens array according to the present invention will be explained, referring to FIG. 4.

Figure 4:
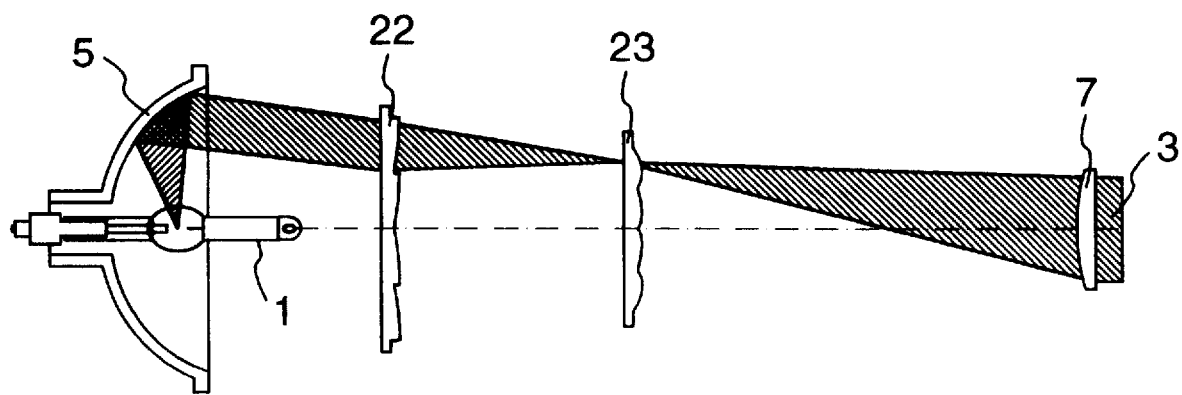
FIG. 4 is a cross-sectional diagram showing the principle of illumination optics used in FIG. 1.

FIG. 4 is a cross-sectional view showing the principle of the action of the lens arrays in the illumination optics according to the present invention.

In the illumination optics indicated in FIG. 4, light emitted from the light source 1 enters the first lens array 22 to be focused on the second lens array 23. After having passed through the second lens array, it enters the condenser lens 7 to irradiate the liquid crystal display elements 3. At that time, the first lens array 22 is so set that the image of the lighting point of the light source 1 is focused at the position of the second lens array 23. In this way, the light flux passing through the second lens array 23 is made narrow and as the result the first lens array 22 has a function to increase the ratio of the amount of light passing through the second lens array 23.

Further the second lens array 23 has a same number of lenses (18 in the embodiment of the present invention) as the first lens array 22, each lens of the former corresponding to the respective lens of the latter, and each lens of the second lens array 23 has a function to focus a rectangular aperture figure of a corresponding lens of the first lens array 22 on the liquid crystal display elements 3. As the result, the shape of light irradiating the liquid crystal display elements 3 is rectangular and it is possible to realize an image, which is bright in the whole, and easy to see, in which brightness uniformity is high.

Figure 5:
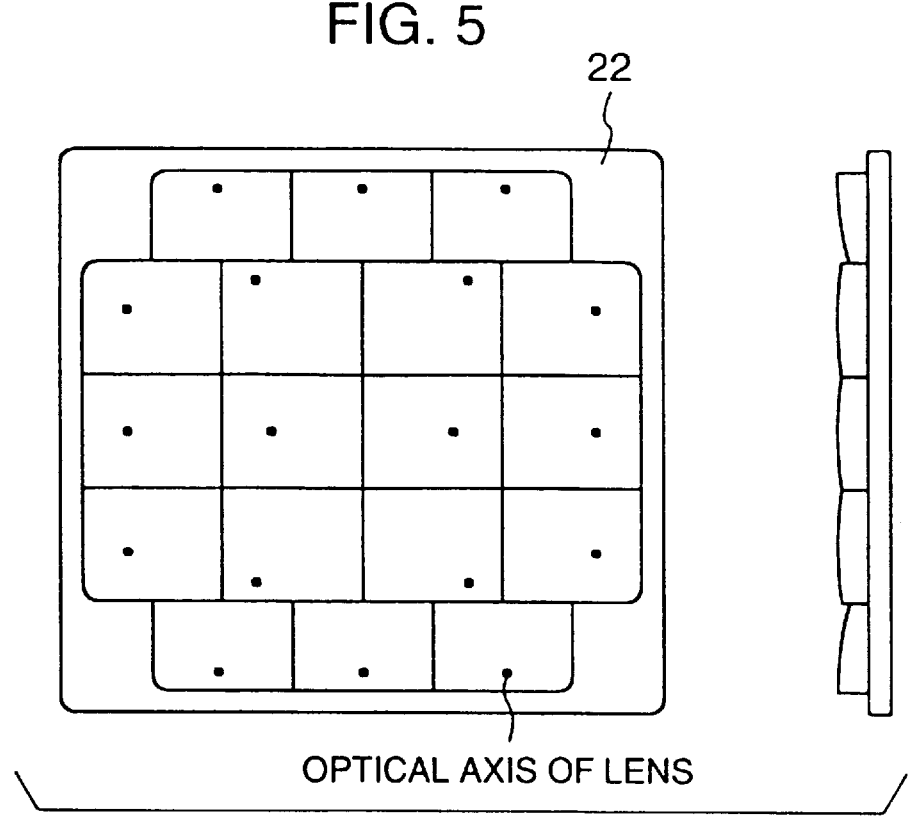
FIG. 5 is a cross-sectional view and a side view showing a n example of the shape of a first lens array used in FIG. 1.

FIG. 5 shows an example of the shape of the first lens array 22 according to the present invention.

As indicated in FIG. 5, the shape of each of the lenses constituting the first lens array 22 is rectangular and thus it is possible to irradiate the liquid crystal display elements 3 with light spots, each of which is rectangular. Further, each of black points indicated in FIG. 5 represents an optical axis of each of the lenses constituting the first lens array 22. The position of the light focused on the second lens array 23 by the first lens array 22 can be controlled by the fact that the optical axis of each lens is shifted from the geometrical center of the rectangular shape and in this way it is possible to increase the amount of light passing through the second lens array 23 while decreasing the size of the second lens array 23 by setting the optical axis at the optimum position.

Figure 6:
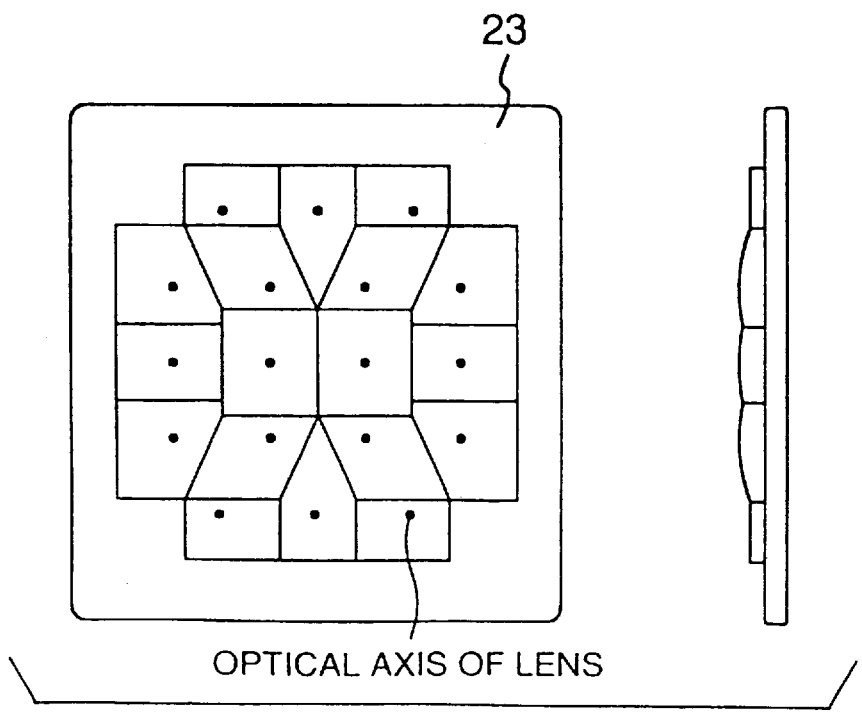
FIG. 6 is a cross-section al view and a side view showing an example of the shape of a second lens array used in FIG. 1.

FIG. 6 shows an example of the shape of the second lens array 23 according to the present invention.

As indicated in FIG. 6, the second lens array 23 according to the present invention is constructed by lenses, each of which has an aperture figure quadrilateral or pentagonal. In case where a lamp as indicated in FIG. 3 is used as a light source, the cross section of the lighting point is usually approximately elliptic and as the result, the image of the lighting point of the light source on the second lens array 23 formed by the first lens array 22 is approximately elliptic. For this reason, if the lenses constituting the second lens array 23 are rectangular, there exist many portions, for which light transmittance is low, i.e. dead spaces, which gives rise to a problem that the second lens array 23 should be large or that light utilization efficiency is low. According to the present invention, owing to the fact that the aperture figure of the lenses of the second lens array 23 at least one is quadrilateral and at least one is pentagonal, as indicated in FIG. 6, the dead spaces are decreased and illumination optics having a high light utilization efficiency can be obtained while keeping the small size of the whole device.

Owing to the functions described above, by using small liquid crystal display elements, it is possible to realize a bright liquid crystal display device having an image, which is uniform over a whole screen, and a good image quality performance, even if the whole display device is small.

Next a concrete whole construction of the projection type liquid crystal display device according to the present invention will be explained.

Figure 7:
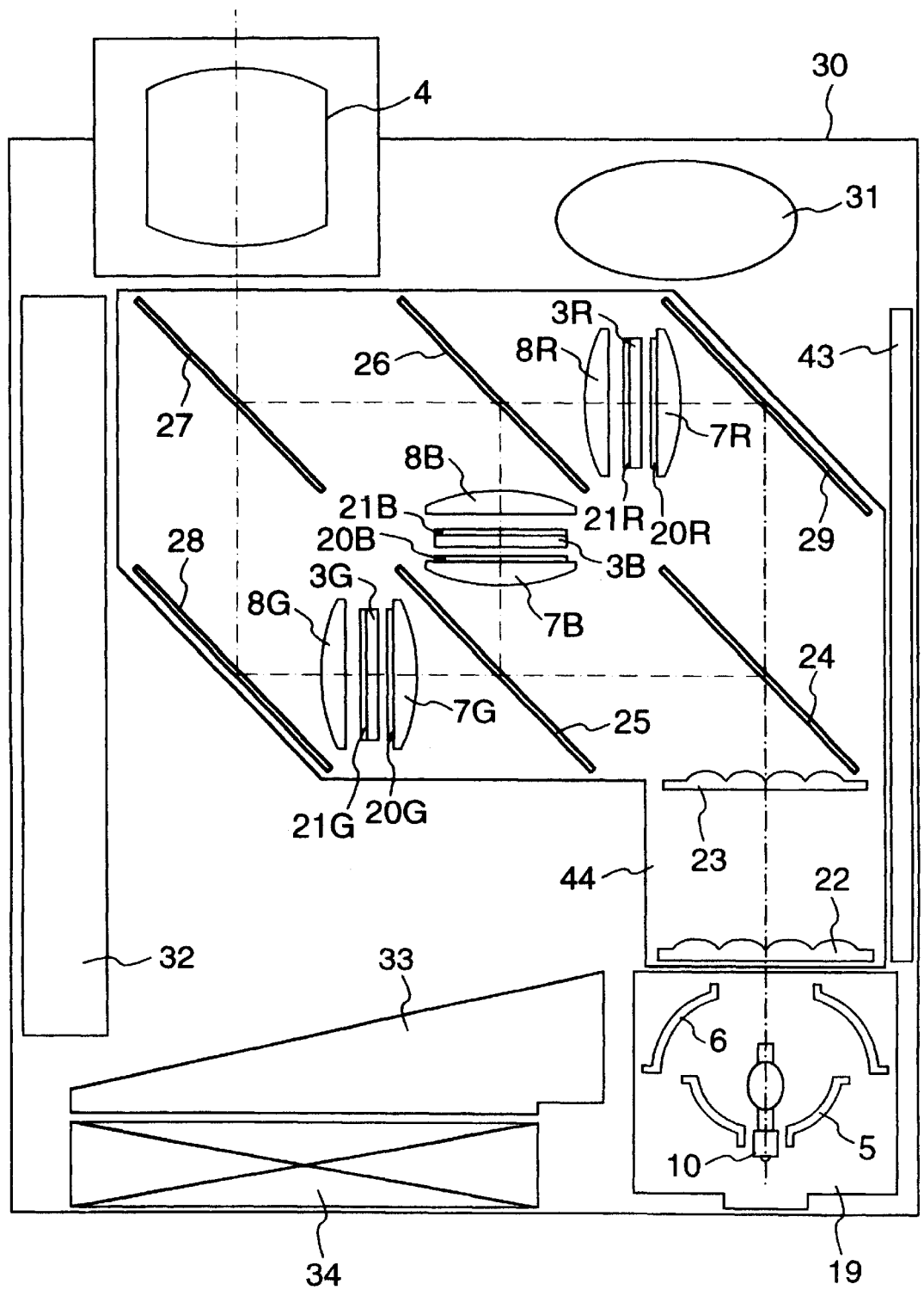
FIG. 7 is a diagram showing the construction of an embodiment of a projection type liquid crystal display device according to the present invention.

FIG. 7 is a diagram showing an embodiment of the projection type liquid crystal display device according to the present invention.

The embodiment indicated in FIG. 7 shows a three plate projection type liquid crystal display device using 3 plates in total, in which transmission type liquid crystal display elements acting as liquid crystal light valves correspond to three colors, which are the three primary colors, i.e. R (red), G (green) and B (blue). In the present embodiment, light emitted by a lamp 10 serving as the light source, which is e.g. a metal halide lamp, enters the first lens array 22 after having been reflected by the elliptic mirror 5 or the spherical mirror 6. Light, which has passed through the first lens array 22, passes through the second lens array 23. Thereafter light of G (green) and B (blue) is reflected by an R (red) transmission dichroic mirror arranged at an angle 45° with respect to the optical axis and light of R (red) is transmitted therethrough. The optical path of a reflected R light beam is bent by a reflective mirror 29, passes through a condenser lens 7R and an incident side polarizer 20R to enter liquid crystal display elements 3R constructed by a counter-electrode, liquid crystals, etc. and passes through an exit side polarizer 21R and a field lens 8R disposed on the light exit side of the liquid crystal display elements 3R. An R light beam exiting from the field lens 8R passes through a dichroic mirror 26 having a function of making the R light beam pass through to enter projection optics 4 such as e.g. a zoom lens after having been reflected by a dichroic mirror 27 having a function of reflecting the R light beam and the B light beam. On the other hand the G light beam and the B light beam reflected by the R transmission dichroic mirror 24 enters a B reflection dichroic mirror 25. The B light beam is reflected by the mirror passes through a condenser lens 7B and an incident side polarizer 20B to enter liquid crystal display elements 3B and passes through an exit side polarizer 21B and a field lens 8B disposed on the light exit side of the liquid crystal display elements 3B. The B light beam exiting from the field lens 8B is reflected by the dichroic mirror 26 having a function of reflecting the B light beam to enter the projection optics 4 after having been reflected by the dichroic mirror 27 together with the R light beam.

On the other hand, the G light beam, which has passed through a dichroic mirror 25, passes through a condenser lens 7G and an incident side polarizer 20G to enter liquid crystal display elements 3G and passes through an exit side polarizer 21G and a field lens 8G disposed on the light exit side of the liquid crystal display elements 3G.

The G light beam exiting from the field lens 8G is reflected by a reflective mirror 28 to enter the projection optics 28 after having been transmitted by the dichroic mirror 27 together with the R light beam and the B light beam. In this way, the light beams corresponding to R, G and B are separated and combined by color separation optics and color combination optics and the projection optics 4 enlarge an image on the liquid crystal display elements corresponding to R, G and B to obtain a real image by combining and enlarging the images of the different colors on a screen. In FIG. 7, 30 is a housing; 31 is a speaker; 32 is a power s upply circuit; and 43 is an image signal circuit. Further 33 is a blowoff duct having a function of conducting wind from a case 19, etc. for the illumination optics 2 to a blowoff fan 34. Further the speaker 31 gives users voice information parallelly to image information.

The size of the whole device is decreased and the shape thereof is rectangular by arranging the illumination optics 2 and the projection optics 4 so that optical axes thereof are parallel to each other and further by arranging the power supply circuit 32 and the image signal circuit 42 through a color separation and combination unit 44 consisting of the color separation optics, the liquid crystal display elements and the color combination optics, as indicated in the figure. In this way it is possible to obtain a shape suitable for a utilization mode in a meeting room, etc., in which a shorter side of the rectangle is facing the screen side.

The lamp 10 in the present embodiment is a metal halide lamp as indicated e.g. in FIG. 3. The functions of the illumination optics including the lamp are as described previously and explanation thereof is omitted here.

A transmission type liquid crystal panel of p–SiTFT e.g. of class, where the diagonal of the image screen is 1 inch long, is used for the liquid crystal display elements 3 in the present embodiment in order to realize the down-sizing of the whole device. For the liquid crystal display elements, e.g. 3R, there are disposed the incident side polarizer 20R, which is a polarizer transmitting linearly polarized light, and the exit side polarizer 21R, which is a polarizer transmitting linearly polarized light having a polarization plane, rotated by 90° with respect to the incident side polarizer 20R. Image information is displayed by controlling the transmitted amount of incident light while combining the function of rotating the polarization plane by the electro-optical effect of liquid crystal in the liquid crystal display elements 3R with the function of selecting a polarization component of the incident side polarizer 20R and the exit side polarizer 21R serving as polarizers. It can be said that this is identical for B and R.

19 in FIG. 7 represents a case for the illumination optics 2. In case where any satisfactory image quality performance such as brightness, etc. as a display device can be obtained no more because of an expired life time of the lamp, the lamp can be exchanged by exchanging the case 19 whole. A concrete example of display means having such a construction will be explained, referring to FIG. 8.

Figure 8:
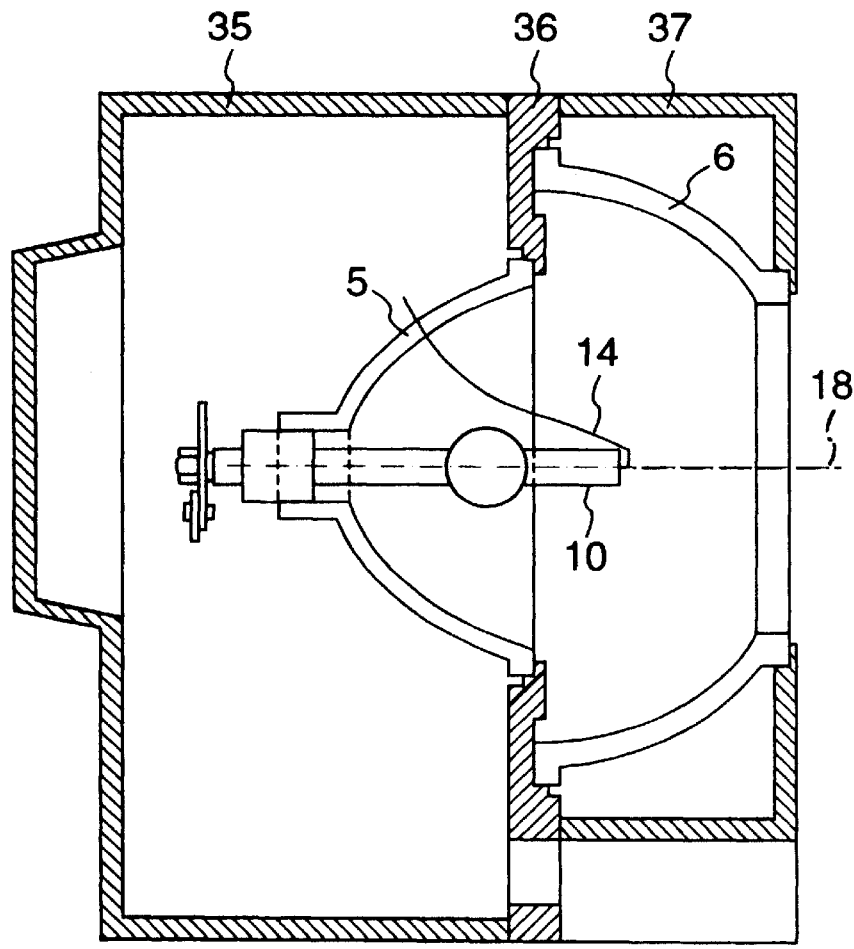
FIG. 8 is a diagram showing the construction of a concrete example of illumination optics used in the projection type liquid crystal display device according to the present invention.

FIG. 8 is a cross-sectional view showing the construction of a concrete example of display means applied to the projection type liquid crystal display device according to the present invention.

The example indicated in FIG. 8 is so constructed that the elliptic mirror 5 and the spherical mirror 6 are arranged, through a holding reflective mirror plate 36. In this way the elliptic mirror 5 and the spherical mirror 6 can be located precisely. Particularly, in case where small size liquid crystal display elements are used, and further in case where the light utilization efficiency is high, since positional precision for the elliptic mirror 5 and the spherical mirror 6, etc. is severe, it is efficient to arrange them through a member. Further the example indicated in FIG. 8 is so constructed that the holding plate 36 is put between other members 35 and 37 and in this way mounting work at fabrication can be effected easily.

Figure 9:
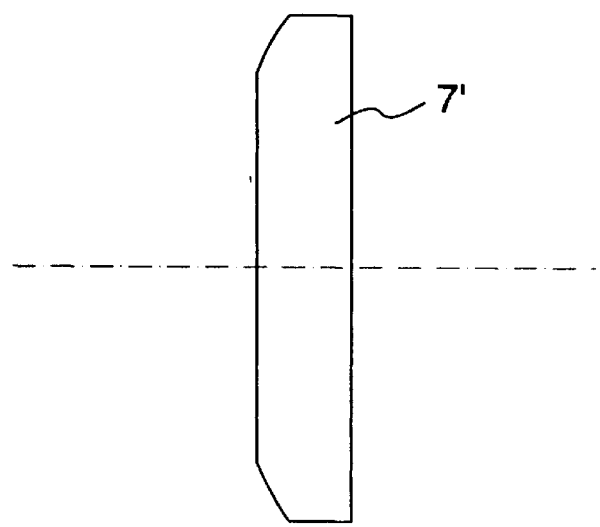
FIG. 9 is a diagram showing another embodiment of a condenser lens in FIG. 1.

In the construction according to the present invention it is useful for increasing in brightness uniformity over the whole screen, light utilization efficiency, etc. to have either one or a plurality of the elliptic mirror 5, the spherical mirror 6, the first lens array 22, the second lens array 23, the condenser lens 7 and the field lens 8 have a shape varied at the peripheral portion with respect to the portion near the optical axis. For example, in case where the central portion near the optical axis of the condenser lens 7 has a not spherical shape close to a plane, as indicated in FIG. 9, the ratio of the brightness at the peripheral portion to the brightness at the central portion can be increased further, which improves brightness uniformity over the whole screen.

As described above, according to the present invention, it is possible to increase utilization efficiency of the light emitted by the light source and thus to realize a bright projection type liquid crystal display device having a small size and a good image quality performance.

What is claimed is:

1. A projection type liquid crystal display device comprising:
    a light source;
    illumination optics having a function of irradiating a plane to be irradiated with light emitted by said light source;
    liquid crystal display elements modulating light; and
    projection optics for projecting light exiting from said liquid crystal display elements;
    wherein said illumination optics include at least an elliptic mirror and a spherical mirror, and said illumination optics include further a first lens array and a second lens array, in which a plurality of lenses are arranged perpendicularly to an optical axis, from the light source side; and a condenser lens for irradiating said liquid crystal display elements with light after exit from said second lens array with a high efficiency, and wherein said lenses constituting said first lens array disposed on the light source side in said illumination optics are rectangular and at least one lens thereof has an optical axis, which is not at the center of a rectangular shape.

2. A projection type liquid crystal display device comprising:
    a light source;
    illumination optics having a function of irradiating a plane to be irradiated with light emitted by said light source;
    liquid crystal display elements modulating light; and
    projection optics for projecting light exiting from said liquid crystal display elements;
    wherein said illumination optics include at least an elliptic mirror and a spherical mirror, and said illumination optics include further a first lens array and a second lens array, in which a plurality of lenses are arranged perpendicularly to an optical axis, from the light source side; and a condenser lens for irradiating said liquid crystal display elements with light after exit from said second lens array with a high efficiency, and wherein at least one of said lenses constituting said second lens array disposed on the side of said liquid crystal display elements in said illumination optics are rectangular and at least one lens thereof has an optical axis, which is not at the center of a rectangular shape.

3. A projection type liquid crystal display device comprising:
    a light source;
    illumination optics having a function of irradiating a plane to be irradiated with light emitted by said light source;
    liquid crystal display elements modulating light; and
    projection optics for projecting light exiting from said liquid crystal display elements;
    wherein said illumination optics include at least an elliptic mirror and a spherical mirror, and said illumination optics include further a first lens array and a second lens array, in which a plurality of lenses are arranged perpendicularly to an optical axis, from the light source side; and a condenser lens for irradiating said liquid crystal display elements with light after exit from said second lens array with a high efficiency, wherein said condenser lens has non-spherical shape close to a plane at a central portion close to an optical axis.

4. A projection type liquid crystal display device according to claim 3, wherein at least one is quadrilateral and at least one is pentagonal among said lenses constituting said second lens array.

5. A projection type liquid crystal display device including a light source, illumination optics that irradiate a plane with light emitted by the light source, liquid crystal display elements which modulate the light, and projection optics that project the light exiting from the liquid crystal display elements, wherein:
    the illumination optics provide at least one ellipse mirror, a first lens array having a plurality of lenses disposed perpendicularly on an optical axis from the light source side, a second lens array, and a condenser lens for irradiating the liquid crystal display elements with the light after exiting from the second lens array with a high efficiency;

each of the lenses constituting the first lens array disposed on the light source side of the illumination optics has a rectangular shape; and at least one lens of which an optical axis is not present on a center of the rectangular shape is provided.

6. A projection type liquid crystal display device according to claim 5 wherein the illumination optics has at least one spherical mirror.

7. A projection type liquid crystal display device including a light source, illumination optics which irradiate a plane with light emitted by the light source, liquid crystal display elements which modulate the light emitted by the light source, projection optics which project the light exiting from the liquid crystal display elements, wherein:

the illumination optics provide at least one ellipse mirror, one spherical mirror, a first lens array having a plurality of lenses disposed perpendicularly on an optical axis from the light source side, a second lens array, a condenser lens for irradiating the liquid crystal display elements with the light after exiting from the second lends array with a high efficiency;

wherein each of the lenses of the second lens array has a rectangular shape; and the optical axis of the lens is not positioned on center of the rectangular shape.

8. A projection type liquid crystal display device according to claim 7 wherein the illumination optics has at least one spherical mirror.

9. A projection type liquid crystal display device including a light source, illumination optics which irradiate a plane with light emitted by the light source, liquid crystal display elements which modulate the light, and projection optics which project the light exiting from the liquid crystal display elements, wherein:

the illumination optics have at least one ellipse mirror and one spherical mirror; and the light source has a light emitting bulb with a reflective layer applied, wherein the reflective layer reflects light emitted from a lighting point of the light source, which is not directly incident on the spherical mirror, onto the spherical mirror.

10. A projection type liquid crystal display device according to claim 9 wherein a reflection surface of the spherical mirror is formed of a reflection film for also reflecting a light present out of visible light range.

11. A projection type liquid crystal display device according to claim 10 wherein the reflection surface of said spherical mirror includes a reflective film formed by an aluminum evaporation.

12. A projection type liquid crystal display device including a light source, illumination optics which irradiate a plane with light emitted by the light source, liquid crystal display elements which modulate the light, projection optics which project the light exiting from the liquid crystal display elements, wherein:

a lens constituting a lens array provided between the illumination optics and the liquid crystal display elements includes a lens having at least one rectangular shape, a lens having at least one quadrilateral shape and a lens having at least one pentagonal shape.

13. A projection type liquid crystal display device including a light source, irradiation means for irradiating an emitted light from the light source on a place to be irradiated, a liquid crystal display elements for modulating the light, and projection means for projecting the emitted light from the liquid crystal display elements, wherein said irradiation means includes at least an elliptic mirror and a spherical mirror, irradiating the light from said irradiation means on a lens array in which optical axes of lenses of said lens array deviate from respective centers of said lenses.

14. A projection type liquid crystal display device according to claim 13, wherein at least one of said lenses of said lens array is of a rectangular form.

15. A projection type liquid crystal display device according to claim 13, wherein said lenses of said lens array include at least one lens having a quadrilateral form and at least one lens having a pentagonal form.

* * * * *